United States Patent [19]
DeBalko

[11] Patent Number: 5,719,917
[45] Date of Patent: Feb. 17, 1998

[54] CIRCUIT FOR ACTIVATING BACK-UP LINES

[75] Inventor: George Andrew DeBalko, Long Valley, N.J.

[73] Assignee: Lucent Technologies Inc., Murray Hill, N.J.

[21] Appl. No.: 578,260

[22] Filed: Dec. 26, 1995

[51] Int. Cl.[6] .......................... H04M 1/29; H04M 3/08; H04M 3/22

[52] U.S. Cl. .......................... 379/2; 379/22; 379/29; 379/221; 379/1; 370/223

[58] Field of Search .......................... 379/1, 2, 3, 4, 379/5, 6, 22, 27, 29, 32, 221; 370/13, 17, 241, 242, 244, 248, 250, 251, 723

[56] References Cited

U.S. PATENT DOCUMENTS

| | | | |
|---|---|---|---|
| 4,594,704 | 6/1986 | Ollivier | 379/2 |
| 4,807,277 | 2/1989 | Perry | 379/29 |
| 5,001,741 | 3/1991 | Sayer | 379/27 |
| 5,357,556 | 10/1994 | Dresser | 379/27 |
| 5,524,043 | 6/1996 | Debalko | 379/2 |

*Primary Examiner*—Curtis Kuntz
*Assistant Examiner*—Paul Looris
*Attorney, Agent, or Firm*—Lester H. Birnbaum; Claude R. Narcisse

[57] ABSTRACT

Disclosed is a circuit which permits automatic switching between a main line and spare line at a subscriber's network interface device. A relay is provided between the two lines, which relay is triggered by a ringing signal on the line to be used.

6 Claims, 1 Drawing Sheet

CIRCUIT FOR ACTIVATING BACK-UP LINES

FIELD OF THE INVENTION

This invention relates to telecommunications equipment.

BACKGROUND OF THE INVENTION

In telecommunications networks, the subscriber receives a drop line in the form of a twisted wire pair from the telephone pole to a network interface device on the side of his or her house. A wire pair from the interface device connects to the customer's apparatus inside the house. A problem arises when the drop line is damaged. In order for the phone company to restore service, it is necessary to dispatch a craftsperson to correct the problem. It would be desirable to provide some back-up line so that service can continue until the problem is corrected.

Some suggestions have been made to substitute spare channel units for defective channel units in the remote terminal of a telecommunications network. (See U.S. Pat. No. 4,435,803 issued to Das et al. and U.S. Pat. No. 4,451,708 issued to Kemler et al.) It does not appear, however, that the art has previously addressed the problems of providing a back-up drop line to the subscriber in the event of damage to the line.

SUMMARY OF THE INVENTION

The invention is a circuit which includes a first and second terminal connectable to a main drop line in a telecommunications network, and a second and third terminal connectable to a spare drop line in the network. The circuit further includes a fifth and sixth terminal alternatively connected to the first terminal through a first switch, the fifth terminal being connectable to a subscriber's inside line and the sixth terminal being connected to one end of a coil. A seventh and eighth terminal are alternatively connected to the second terminal through a second switch, the seventh terminal being connectable to the subscriber's inside line and the eighth terminal being connected to an opposite end of the coil. A ninth and tenth terminal are alternatively connected to the third terminal through a third switch, the ninth terminal being connected to said opposite end of the coil and the tenth terminal being connectable to said subscriber's inside line. An eleventh and twelfth terminal are alternatively connected to the fourth terminal through a fourth switch, the eleventh terminal being connected to said one end of the coil and the twelfth terminal being connectable to the subscriber's inside line.

BRIEF DESCRIPTION OF THE FIGURES

These and other features of the invention are delineated in detail in the following description. In the drawing.

DETAILED DESCRIPTION

Figure 1:
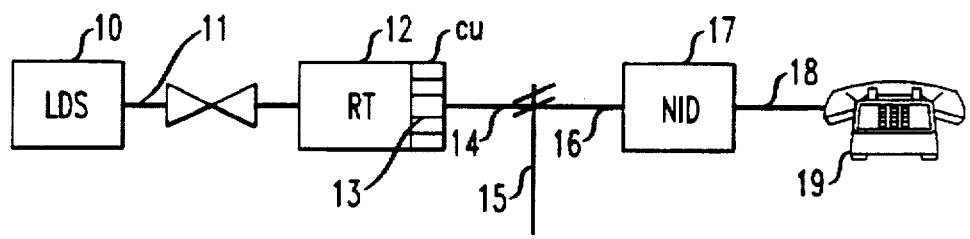
FIG. 1 illustrates a portion of a telecommunications system which may incorporate the present invention.

Referring now to the drawings, in which like reference numerals identify similar or identical elements, FIG. 1 illustrates a typical digital loop carrier transmission system which may utilize the invention. The invention may also be used in other telecommunications networks such as a combined telephony and broadband system.

Signal transmission is provide over a bi-directional link, 11, which may be copper wires or optical fibers, between a Local Digital Switch (LDS), 10, and a Remote Terminal (RT), 12. The RT includes a plurality of Channel Units (CUs), e.g., 13, each providing an interface for, typically, 1 to 4 subscriber lines. Thus a cable, 14, including a plurality of twisted wire pairs is run from the RT. At a telephone pole, 15, or a pedestal in the vicinity of the subscriber's premises, a drop wire, 16, is coupled from the main cable to a Network Interface Device (NID), 17, which is located usually on the side of the subscriber's premises. Usually, this drop wire, 16, comprises a twisted wire pair for each subscriber line. In accordance with this invention, the drop wire includes a minimum of two twisted wire pairs (20, 21 and 22, 23 of FIG. 2), one of which is the main line and the other of which is a spare line. This spare line would usually run from the RT, 12, to the NID, 17, but could also run from the switch, 10. A single twisted wire pair, 18, for each line is coupled from a standard network interface jack, 40 of FIG. 2, at the NID, 17, to the customer's equipment, such as a phone, 19, inside the subscriber's premises.

Figure 2:
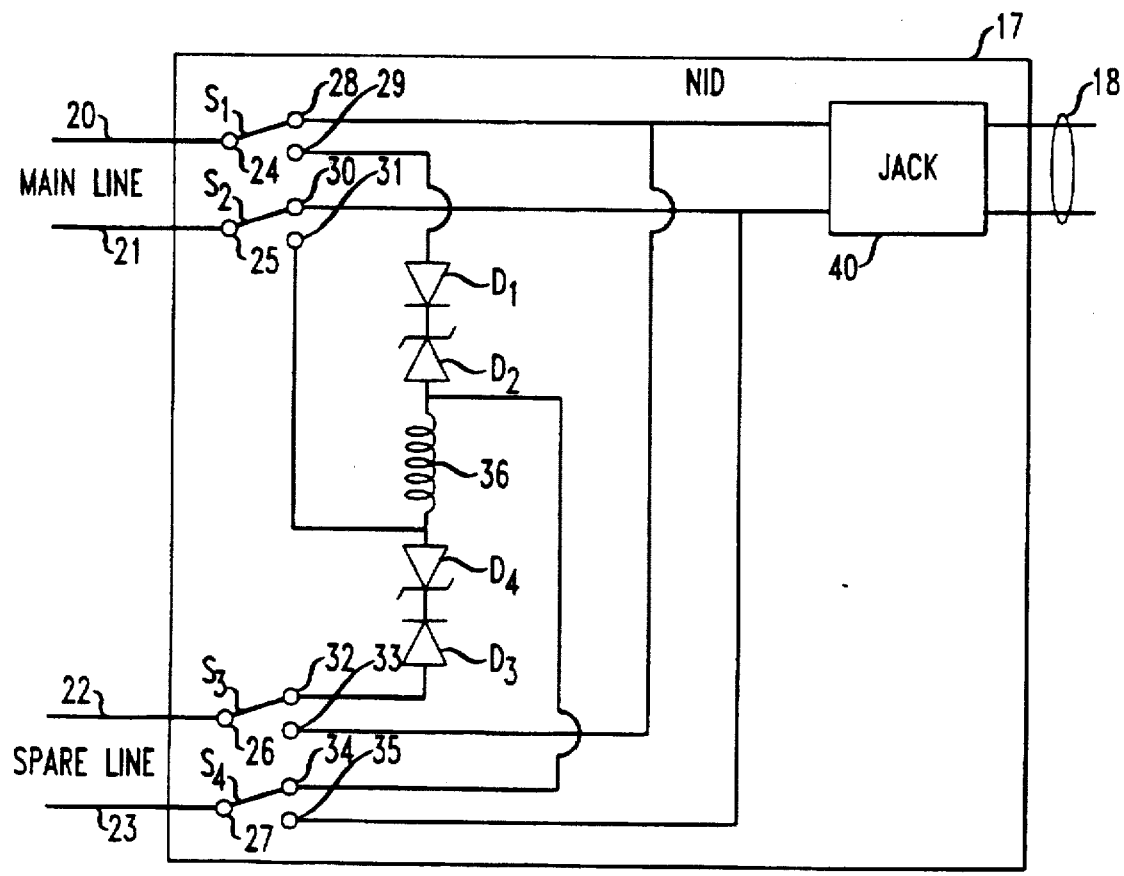
FIG. 2 is a circuit diagram illustrating an embodiment of the invention.

FIG. 2 illustrates a portion of the NID, 17, which includes circuitry in accordance with an embodiment of the invention. The circuit includes a relay having first and second terminals, 24 and 25, which are connected, respectively, to the tip and ring wires, 20 and 21, of the main line, and third and fourth terminals, 26 and 27, which are connected, respectively, to the tip and ring wires, 22 and 23, of the spare line. A pair of terminals, 28 and 29, are each alternatively connected to first terminal, 24, depending upon the position of switch, $S_1$. Another pair of terminals, 30 and 31, are each alternatively connected to the second terminal, 25, depending upon the position of switch, $S_2$. Similarly, a further pair of terminals, 32 and 33, are each alternatively connected to the third terminal, 26, depending upon the position of switch, $S_3$, and a further pair of terminals, 34 and 35, are each alternatively connected to the fourth terminal, 27, depending upon the position of switch, $S_4$.

Terminals 28 and 33 are connected to the tip input of a standard jack, 40, while terminals 30 and 35 are connected to the ring input of the jack, 40. Terminal 29 is connected to one end of a coil, 36, through a pair of oppositely biased diodes, $D_1$ and $D_2$. Specifically, terminal 29 is coupled to the anode of a standard diode, $D_1$, whose cathode is coupled to the cathode of a Zener diode, $D_2$. The anode of the Zener diode, $D_2$ is coupled to the coil, 36. Terminal 32 is similarly coupled to the opposite end of the coil, 36, through a pair of diodes, $D_3$ and $D_4$. Terminal 31 is also coupled to the opposite end of the coil, 36, but not through any of the diodes, $D_1$–$D_4$. Similarly, terminal 34 is connected directly to the same end as terminal 29, but not through any of the diodes.

The standard network interface (SNI) jack, 40, is coupled to a twisted wire pair, 18, which extends into the subscriber's premises for connection to his or her equipment, 19 of FIG. 1.

In operation, the switches, $S_1$ and $S_2$, are normally in the position shown where terminal 24 is connected to terminal 28 and terminal 25 is connected to terminal 30 (closed position) so that the main line wires, 20 and 21, are coupled to jack, 40, to transmit telecommunications signals to and from the subscriber. Switches, $S_3$ and $S_4$ are normally in the position shown where terminal 26 is coupled to terminal 32 and terminal 27 is connected to terminal 34 (open position) so that the spare wires, 22 and 23, are disconnected from the subscriber and connected to coil 36. In the event that the wires, 20 and 21, of the main line are damaged, the LDS, 10 of FIG. 1, will send a signal, typically a standard ringing signal, on the wires, 22 and 23, of the spare line. This signal will be sent through terminals, 32 and 34, so that a positive potential of sufficient magnitude from terminal, 32, e.g., ≈130 volts, will break over Zener diode, $D_4$, and energize relay 36, thereby causing all switches, $S_1$–$S_4$, to change positions. This results in the closing of switches, $S_3$ and $S_4$, so that the wires, 22 and 23, of the spare line are now coupled to the jack, 40, to transmit signals to and from the subscriber. Meanwhile, switches, $S_1$ and $S_2$, are opened so that the wires, 20 and 21, of the main line are disconnected from the jack and are, instead, coupled through terminals, 29 and 31, to the coil, 36. Once the main line is repaired, the LDS will send a ringing signal on wires, 20 and 21, which produces a positive potential to break over Zener diode $D_2$ and energize the coil, 36, with an opposite polarity. This causes the switches, $S_1$–$S_4$, to return to their normal positions illustrated in FIG. 2.

Thus, transmission is automatically switched between the main line and spare line to allow continued service for those subscribers without the need to send a craftsperson to the scene.

What is claimed is:

1. A circuit comprising:

a first and second terminal connectable to a main drop line in a telecommunications network;

a second and third terminal connectable to a spare drop line in the network;

a fifth and sixth terminal alternatively connected to the first terminal through a first switch, the fifth terminal being connectable to a subscriber's inside line and the sixth terminal being coupled to one end of a coil;

a seventh and eighth terminal alternatively connected to the second terminal through a second switch, the seventh terminal being connectable to the subscriber's inside line and the eighth terminal being coupled to an opposite end of the coil;

a ninth and tenth terminal alternatively connected to the third terminal through a third switch, the ninth terminal being coupled to said opposite end of the coil and the tenth terminal being connectable to the subscriber's inside line; and an eleventh and twelfth terminal alternatively connected to the fourth terminal through a fourth switch, the eleventh terminal being coupled to said one end of the coil and the twelfth terminal being connectable to the subscriber's inside line.

2. The circuit according to claim 1 wherein the sixth and ninth terminals are coupled to respective ends of the coil through respective pairs of oppositely biased diodes.

3. The circuit according to claim 2 wherein one of the diodes in each pair is a Zener diode.

4. The circuit according to claim 1 further comprising a jack which is connectable to the inside line, the fifth, seventh, tenth and twelfth terminals being coupled to said jack.

5. The circuit according to claim 3 wherein the coil is such as to change positions of the first, second, third, and fourth switches when a signal is applied thereto from two of the terminals connected thereto.

6. The circuit according to claim 5 wherein the signal is a ringing signal.

\* \* \* \* \*